US011084272B2

(12) United States Patent
Pavlov et al.

(10) Patent No.: US 11,084,272 B2
(45) Date of Patent: Aug. 10, 2021

(54) TEST STRUCTURE FOR ADDITIVE MANUFACTURE AND RELATED METHOD FOR EMITTER ALIGNMENT

(71) Applicant: General Electric Company, Schenectady, NY (US)

(72) Inventors: Mikhail Pavlov, Dietikon (CH); Kassy Moy Hart, Greenville, SC (US); Kamilla Koenig-Urban, Wettingen (CH)

(73) Assignee: General Electric Company, Schenectady, NY (US)

( * ) Notice: Subject to any disclaimer, the term of this patent is extended or adjusted under 35 U.S.C. 154(b) by 951 days.

(21) Appl. No.: 15/609,092

(22) Filed: May 31, 2017

(65) Prior Publication Data

US 2018/0345409 A1 Dec. 6, 2018

(51) Int. Cl.
*B33Y 10/00* (2015.01)
*B33Y 50/02* (2015.01)
*B22F 10/20* (2021.01)

(52) U.S. Cl.
CPC .............. *B33Y 10/00* (2014.12); *B22F 10/20* (2021.01); *B33Y 50/02* (2014.12); *B22F 2999/00* (2013.01)

(58) Field of Classification Search
CPC ............... B22F 2999/00; B22F 3/1055; B22F 2203/03; B33Y 10/00; B33Y 50/02; Y02P 10/25; B23K 26/082; G02B 26/10; G02B 26/105
USPC ....................................................... 219/76.1
See application file for complete search history.

(56) References Cited

U.S. PATENT DOCUMENTS

| 5,430,666 | A | 7/1995 | DeAngelis et al. |
| 5,536,467 | A | 7/1996 | Reichle et al. |
| 9,468,973 | B2 | 10/2016 | Ljungblad |
| 2013/0112672 | A1 | 5/2013 | Keremes et al. |
| 2015/0048064 | A1* | 2/2015 | Cheverton ........... B23K 26/032 219/121.63 |
| 2016/0082668 | A1* | 3/2016 | Perret ................... B29C 64/277 264/406 |
| 2016/0144571 | A1 | 5/2016 | Philippi |
| 2016/0303806 | A1 | 10/2016 | Mercelis |

FOREIGN PATENT DOCUMENTS

| EP | 2827897 A1 | 1/2015 |
| WO | 2013142371 A1 | 9/2013 |
| WO | 2015191257 A1 | 7/2015 |

* cited by examiner

*Primary Examiner* — Dana Ross
*Assistant Examiner* — James F Sims, III
(74) *Attorney, Agent, or Firm* — Hoffman Warnick LLC (57) ABSTRACT

Embodiments of the disclosure provide a test structure for additive manufacture and related methods for emitter alignment. A test structure according to the disclosure can include: a body having a reference surface, wherein the body is formed with a first beam scanner of the AM system; and a plurality of calibration features defined on the reference surface of the body, wherein each of the plurality of calibration features includes an alignment surface positioned at an offset distance relative to the reference surface, and wherein each of the plurality of calibration features is formed with a second beam scanner of the AM system different than the first beam scanner.

6 Claims, 11 Drawing Sheets

TEST STRUCTURE FOR ADDITIVE MANUFACTURE AND RELATED METHOD FOR EMITTER ALIGNMENT

TECHNICAL FIELD

The subject matter disclosed herein relates to additive manufacturing. More particularly, the subject matter disclosed herein relates to test structures for additive manufacturing (AM) systems and related methods for alignment therefor.

BACKGROUND

Additive manufacturing includes a wide variety of processes of producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, and creating a file with a two-dimensional image of each layer. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a build platform. The build platform can be moved in a vertical axis. The process takes place in a processing chamber having a precisely controlled atmosphere of inert gas, e.g., argon or nitrogen. Once each layer is created, each two dimensional slice of the object geometry can be fused by selectively melting or sintering the metal powder. The melting or sintering may be performed by, for example, a high powered scanning beam, such as a 100 Watt ytterbium laser, to sinter or fully weld (melt) the metal powder to form a solid object. The scanning beam moves in the X and Y directions using scanning mirrors, and has an intensity sufficient to sinter or fully weld (melt) the metal powder to form a solid object. The build platform may be lowered for each subsequent two dimensional layer, and the process repeats until the object is completely formed.

In order to create more objects faster or create larger objects, some metal additive manufacturing systems employ numerous high powered scanning beam emitters, e.g., two, three, or four lasers, that work together to form numerous objects or a larger object on one build platform. For speed, some of these systems employ techniques that form a shell of an object with one scanning beam emitter using a small beam size, and a core of the object with another scanning beam emitter using a larger beam size that melts material adjacent to the shell. Further, for speed or source balancing reasons, some of these systems employ techniques that form a portion of an object with one scanning beam emitter, and at least a second portion with a second scanning beam emitter that melts material adjacent thereto. In either event, scanning melting beam emitters must be precisely aligned to ensure defects do not occur where the two scanning beam emitters work in adjacent or overlapping areas.

Conventional approaches to precisely aligning the melting beam emitters may involve producing test articles. The test articles may be transported to equipment external to the manufacturing system, such as a microscope or coordinate measuring machine after being produced. A fabricator can inspect the produced test articles to determine the status of the melting beam emitters. Conventional test articles are limited by the need to perform several measurements and/or apply special measuring devices to determine whether melting beam emitters in a system are aligned. Inspecting test articles in this manner may create delays in production and/or consume staff time due to the transport of the test article, waiting time for external equipment to be available, and returning the measurements to adjust the melting beam scanner alignment.

SUMMARY

A first aspect of this disclosure is a test structure for an additive manufacturing (AM) system. The test structure for an additive manufacturing (AM) system can include: a body having a reference surface, wherein the body is formed with a first beam scanner of the AM system; and a plurality of calibration features defined on the reference surface of the body, wherein each of the plurality of calibration features includes an alignment surface positioned at an offset distance relative to the reference surface, and wherein each of the plurality of calibration features is formed with a second beam scanner of the AM system different than the first beam scanner.

A second aspect of this disclosure is a method for aligning beam scanners in an additive manufacturing (AM) system. The method for aligning beam scanners in an additive manufacturing (AM) system can include: fabricating a test structure with at least two beam scanners of the AM system, the test structure including: a body on a build platform of the AM system, the body having a reference surface, wherein the body is formed with a first beam scanner of the AM system; and a plurality of calibration features defined on the reference surface of the body, wherein each of the plurality of calibration features includes an alignment surface positioned at an offset distance relative to the reference surface, and wherein each of the plurality of calibration features is formed with a second beam scanner of the AM system different than the first beam scanner; calculating an alignment correction for the first and second beam scanners of the AM system based on a difference between a position of the fabricated plurality of alignment surfaces and an expected position of the plurality of alignment surfaces; and adjusting at least one of the first and second beam scanners based on the calculated alignment correction calculation.

A third aspect of the disclosure includes a non-transitory computer readable medium storing a code representation of a test structure. The non-transitory computer readable storage medium storing a code representative of a test structure, the test structure physically generated upon execution of the code by a computerized additive manufacturing (AM) system, the code can include: code representing the test structure, the test structure including: a body having a reference surface, wherein the body is formed with a first beam scanner of the AM system; and a plurality of calibration features defined on the reference surface of the body, wherein each of the plurality of calibration features includes an alignment surface positioned at an offset distance relative to the reference surface, and wherein each of the plurality of calibration features is formed with a second beam scanner of the AM system different than the first beam scanner.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative. It is understood that similarly numbered and/or named components may function in a substantially similar fashion. Redundant explanation of these components has been omitted for clarity.

As indicated herein, the subject matter disclosed relates to additive manufacturing. More particularly, the subject matter disclosed herein relates to test structures for additive manufacturing (AM) systems and related methods for alignment therefor. Embodiments of the disclosure include of test structures for determining whether multiple beam scanners in an AM system are properly aligned. Test structures according to the disclosure can allow users to observe structural changes arising from misalignment, calculate corrections to the AM system, and adjust the AM system without tools external to the AM system. Various embodiments allow the misalignment to be simultaneously determined along multiple axes, between more than two beam scanners, or any combination thereof, in a single build cycle of the AM system.

Figure 1:
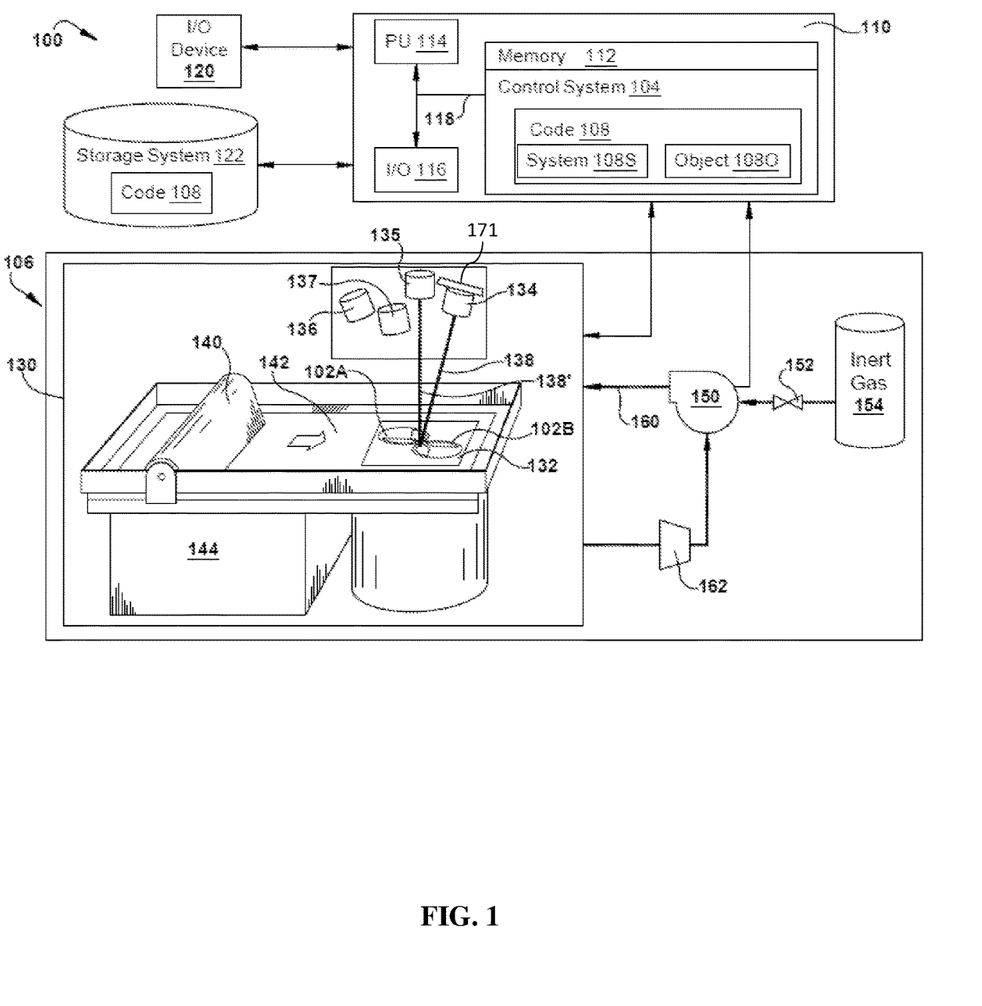
FIG. 1 shows a block diagram of a multiple melting beam additive manufacturing system, including a non-transitory computer readable storage medium storing code representative of an object, according to embodiments of the disclosure.

FIG. 1 shows a schematic/block view of an illustrative computerized metal powder additive manufacturing system 100 (hereinafter 'AM system 100') for generating one object 102 or multiple objects 102A, 102B (shown), of which only a single layer is shown. The teachings of the disclosure will be described relative to building a test structure, one form of object 102, using two or more beam emitters 134, 135, 136, 137, but it is emphasized and will be readily recognized that the teachings of the disclosure are equally applicable to build multiple objects 102A, 102B using multiple beam emitters 134, 135, 136, 137. In this example, AM system 100 is arranged for direct metal laser melting (DMLM). It is understood that the general teachings of the disclosure are equally applicable to other forms of metal powder additive manufacturing such as but not limited to selective laser melting (SLM), and/or other forms of additive manufacturing. Objects 102A, 102B are illustrated as circular elements; however, it is understood that the additive manufacturing processes discussed herein can be readily adapted to manufacture any shaped object, a large variety of objects and a large number of objects on build platform 132.

AM system 100 generally includes a metal powder additive manufacturing control system 104 ("control system") and an AM printer 106. As will be described, control system 104 executes a set of computer-executable instructions or code 108 to generate object 102 using multiple melting beam emitters 134, 135, 136, 137. In the example shown, four melting beam emitters may include four lasers. However, the teachings of the disclosure are applicable to any melting beam emitter, e.g., an electron beam, laser, etc. Control system 104 is shown implemented on computer 110 as computer program code. To this extent, computer 110 is shown including a memory 112 and/or storage system 122, a processor unit (PU) 114, an input/output (I/O) interface 116, and a bus 118. Further, computer 110 is shown in communication with an external I/O device/resource 120 and a storage system 122. In general, processor unit (PU) 114 executes computer program code 108 that is stored in memory 112 and/or storage system 122. While executing computer program code 108, processor unit (PU) 114 can read and/or write data to/from memory 112, storage system 122, I/O device 120 and/or AM printer 106. Bus 118 provides a communication link between each of the components in computer 110, and I/O device 120 can comprise any device that enables a user to interact with computer 110 (e.g., keyboard, pointing device, display, etc.). Computer 110 is only representative of various possible combinations of hardware and software. For example, processor unit (PU) 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of non-transitory computer readable storage medium including magnetic media, optical media, random access memory (RAM), read only memory (ROM), etc. Computer 110 can comprise any type of computing device such as an industrial controller, a network server, a desktop computer, a laptop, a handheld device, etc.

As noted, AM system 100 and, in particular control system 104, executes code 108 to generate object 102. Code 108 can include, inter alia, a set of computer-executable instructions 108S (herein also referred to as 'code 108S') for operating AM printer 106, and a set of computer-executable instructions 108O (herein also referred to as 'code 108O') defining object 102 to be physically generated by AM printer 106. As described herein, additive manufacturing processes begin with a non-transitory computer readable storage medium (e.g., memory 112, storage system 122, etc.) storing code 108. Set of computer-executable instructions 108S for operating AM printer 106 may include any now known or later developed software code capable of operating AM printer 106.

Set of computer-executable instructions 108O defining object 102 may include a precisely defined 3D model of an object and can be generated from any of a large variety of well-known computer aided design (CAD) software systems such as AutoCAD®, TurboCAD®, DesignCAD 3D Max, Materialise Magics, NX, Catia etc. In this regard, code 108O can include any now known or later developed file format. Furthermore, code 108O representative of object 102 may be translated between different formats. For example, code 108O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 108O representative of object 102 may also be converted into a set of data signals and transmitted, received as a set of data signals and converted to code, stored, etc., as necessary. Code 108O may be configured according to embodiments of the disclosure to allow for formation of border and internal sections in overlapping field regions, as will be described. In any event, code 108O may be an input to AM system 100 and may come from a part designer, an intellectual property (IP) provider, a design company, the operator or owner of AM system 100, or from other sources. In any event, control system 104 executes code 108S and 108O, dividing object 102 into a series of thin slices that assembles using AM printer 106 in successive layers of material.

AM printer 106 may include a processing chamber 130 that is sealed to provide a controlled atmosphere for object 102 printing. A build platform 132, upon which object(s) 102 is/are built, is positioned within processing chamber 130. Track systems 171 (FIG. 2) are omitted from FIGS. 3 and 4 solely for clarify of illustration. A number of beam emitters 134, 135, 136, 137 are configured to melt layers of metal powder on build platform 132 to generate object 102. While four beam emitters 134, 135, 136, 137 will be described herein, it is emphasized that the teachings of the disclosure are applicable to a system employing any number of beam emitters, e.g., 2, 3, 5, or more. As shown in the schematic plan view of FIG. 3, each beam emitter 134, 135, 136, 137 has an operating zone 220, 225, 227, or 228 and at least one interlaced region 230 or 232 in which two or more emitters can melt metal powder. In this regard, each beam emitter 134, 135, 136, 137 may generate a melting beam (two shown, 138, 138', in FIG. 1), respectively, that fuses particles for each slice, as defined by code 108O. For example, in FIG. 1, beam emitter 134 is shown creating a layer of object 102 using melting beam 138 in one region, while beam emitter 136 is shown creating a layer of object 102 using melting beam 138' in another region. Each beam emitter 134, 135, 136, 137 is calibrated in any now known or later developed manner. That is, AM system 100 and/or users thereof can correlate the expected position of each melting beam emitter 134, 135, 136, 137 relative to build platform 132 with its actual position in order to provide an individual position correction (not shown) for increased accuracy. In one embodiment, each beam emitter 134, 135, 136, 137 may create melting beams, e.g., 138, 138' (FIG. 1), having the same cross-sectional dimensions (e.g., shape and size in operation), power and scan speed.

Referring to FIG. 1, an applicator 140 may create a thin layer of raw material 142 spread out as the blank canvas from which each successive slice of the final object will be created. Various parts of AM printer 106 may move to accommodate the addition of each new layer, e.g., a build platform 132 may lower and/or chamber 130 and/or applicator 140 may rise after each layer. The process may use different raw materials in the form of fine-grain metal powder, a stock of which may be held in a chamber 144 accessible by applicator 140. In the instant case, object 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc.

Processing chamber 130 is filled with an inert gas such as argon or nitrogen and controlled to minimize or eliminate oxygen. Control system 104 is configured to control a flow of a gas mixture 160 within processing chamber 130 from a source of inert gas 154. In this case, control system 104 may control a pump 150, and/or a flow valve system 152 for inert gas to control the content of gas mixture 160. Flow valve system 152 may include one or more computer controllable valves, flow sensors, temperature sensors, pressure sensors, etc., capable of precisely controlling flow of the particular gas. Pump 150 may be provided with or without valve system 152. Where pump 150 is omitted, inert gas may simply enter a conduit or manifold prior to introduction to processing chamber 130. Source of inert gas 154 may take the form of any conventional source for the material contained therein, e.g. a tank, reservoir or other source. Any sensors (not shown) required to measure gas mixture 160 may be provided. Gas mixture 160 may be filtered using a filter 162 in a conventional manner.

In operation, build platform 132 with metal powder thereon is provided within processing chamber 130, and control system 104 controls flow of gas mixture 160 within processing chamber 130 from source of inert gas 154. Control system 104 also controls AM printer 106, and in particular, applicator 140 and melting beam emitters 134, 135, 136, 137 to sequentially melt layers of metal powder on build platform 132 to generate object 102 according to embodiments of the disclosure.

Each beam emitter 134, 135, 136, 137 can be coupled to a track system 171 of AM system 100. One example is shown and described for beam emitter 134. Redundant explanation of additional track systems has been omitted for clarity. Track system 171 may be configured to adjust a position of and/or move and/or re-aim beam emitter 134 within a build chamber of AM system 100, over build platform 132, during the component build process performed by AM system 100, as discussed herein. Track system 171 may be formed as any suitable component, device and/or system that may be configured to adjust the position and/or move and/or re-aim beam emitter 134. For example, track system 171 may be formed as a four-post track system and cross-bar support that may be configured to move beam emitter 134 in a direction in-and-out of the page, over build platform 132, during the component build process discussed herein. In other non-limiting examples, AM system 100 may include any suitable component and/or system configured to adjust the position and/or aim of beam emitter 134 when performing the component build process, as discussed herein. For example, beam emitter 134 may be coupled and/or fixed to a movable armature that may adjust the position and/or aim of beam emitter 134 in the various required directions to perform the component build process, as discussed herein. Redundant explanation of additional track systems has been omitted for clarity.

Track system 171 may be adjusted manually. Alternatively, track system 171 may be adjusted by control system 104 based either on user input or based on instructions contained in computer code 108 and executed by computer 110. Instead of and/or in addition to adjusting track system 171, control system 104 may modify code 108O defining object 102, e.g., based on the properties of a test structure according to embodiments of the disclosure, to compensate for improper alignment of any or all of beam emitters 134, 135, 136, 137.

Figure 2:
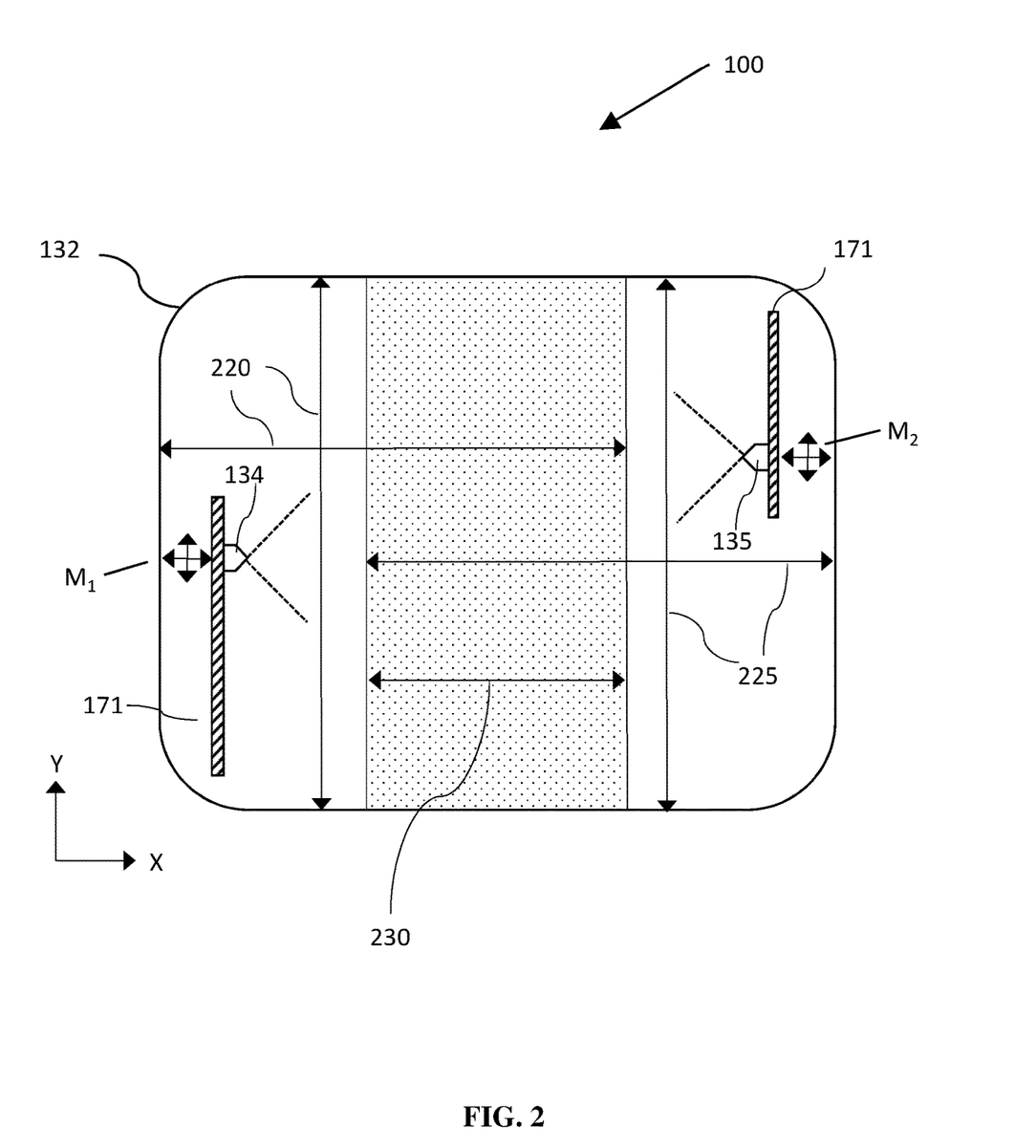
FIG. 2 shows a plan view of an additive manufacturing system build platform with one interlaced region.

FIG. 2 shows a plan view of an additive manufacturing system build platform with one interlaced region, e.g., where test structures according to the disclosure may be produced. Additive manufacturing system 100 can include build platform 132, first beam emitter 134, and second beam emitter 135. First beam emitter 134 may be attached to track system 171 providing freedom of movement M1 on at least one axis. Second beam emitter 135 may be attached to track system 171 providing freedom of movement M2 on at least one axis. First beam emitter 134 covers a first operating zone 220 and second beam emitter 135 covers a second operating zone 225. The region of the build platform where the first operating zone and second operating zone overlap defines an interlaced region 230. An X and Y axis are defined on the build platform 132 and equivalently in interlaced region 230. First and second operating zones 220, 225 may be limited by hardware or software, or may encompass the entire build platform in various additive manufacturing systems.

Figure 3:
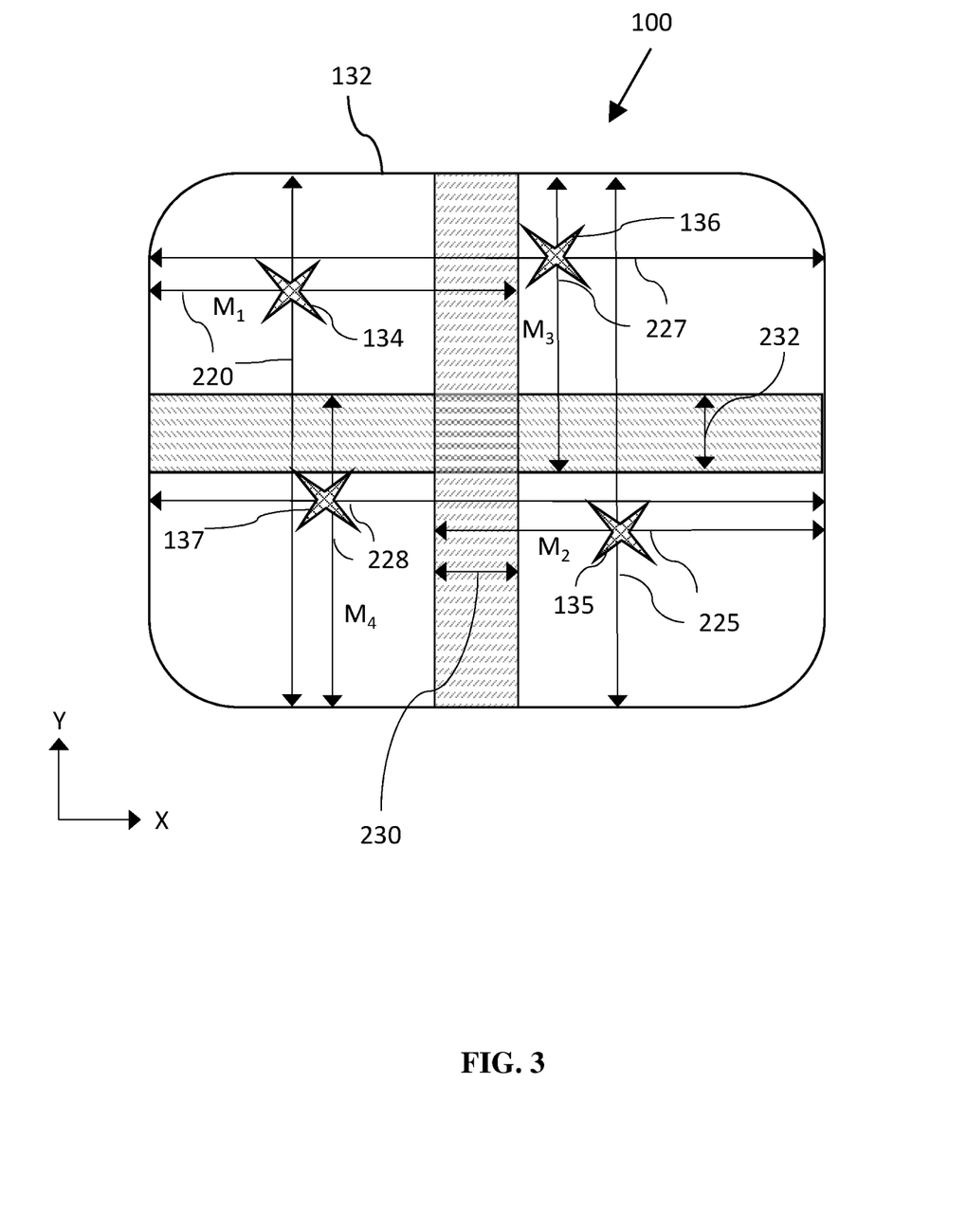
FIG. 3 shows a plan view of an additive manufacturing system build platform with multiple interlaced regions.
Figure 4:
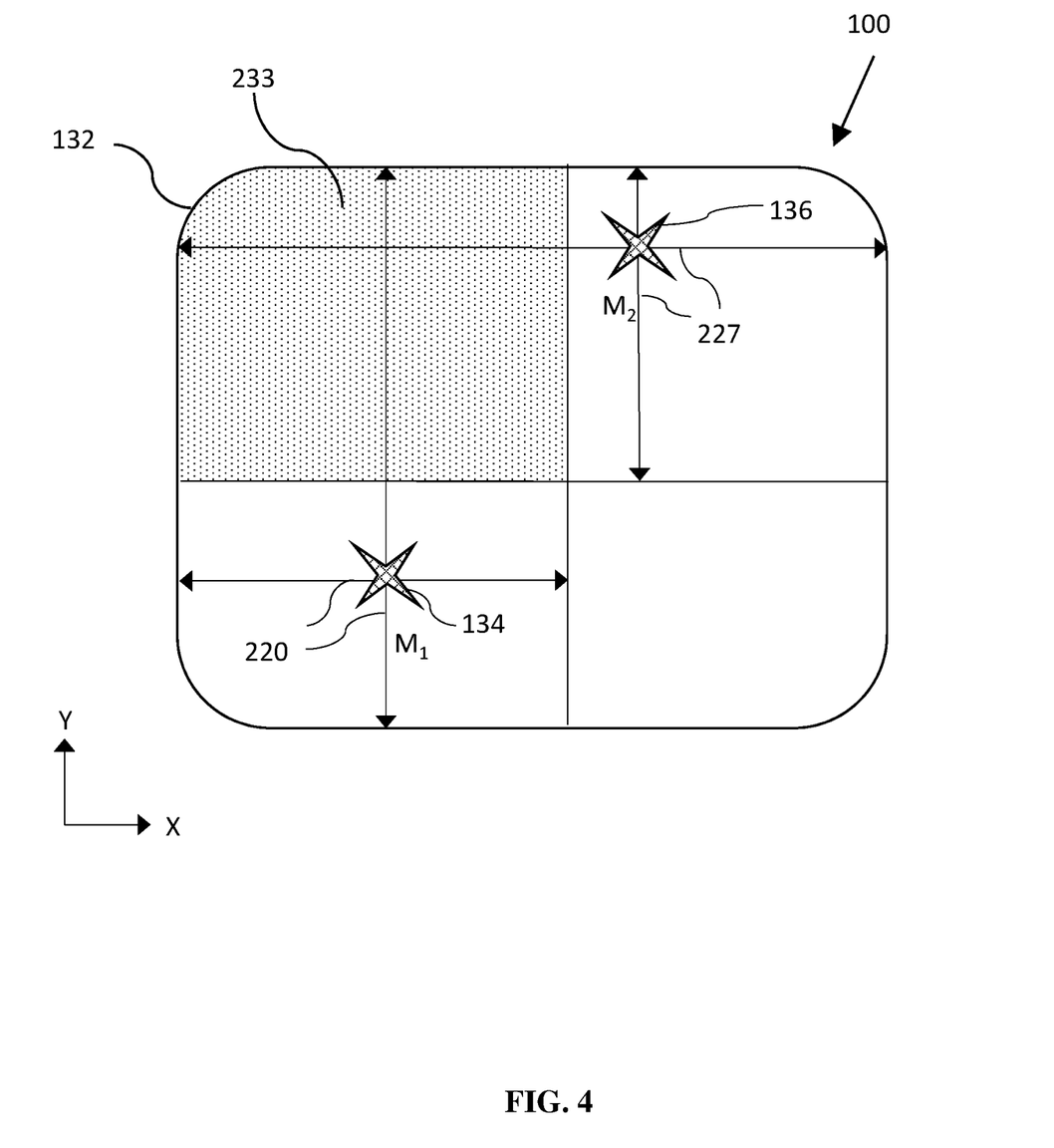
FIG. 4 shows a plan view of an additive manufacturing system build platform with a different group of interlaced regions.

FIGS. 3-4 show plan views of an additive manufacturing system build platform with multiple interlaced regions. As shown, additive manufacturing system 100 can include build platform 132, first beam emitter 134, second beam emitter 135, third beam emitter 136, and fourth beam emitter 137. First beam emitter 134 covers a first operating zone 220, second beam emitter 135 covers a second operating zone 225, third beam emitter 136 covers a third operating zone 227, and fourth beam emitter 137 covers a fourth operating zone 228. As shown in FIG. 3, the region of the build platform where the first operating zone and second operating zone overlap defines an interlaced region 230. The region of the build platform where the third operating zone 227 and fourth operating zone 228 overlap defines a second interlaced region 232. In FIG. 4, by contrast, the region of the build platform where first operating zone 220 and third operating zone 227 overlap defines an interlaced region 233. For clarity, the operating zones of the second beam emitter 135 and the fourth beam emitter 137 are omitted. Likewise, the additional interlaced regions between the first beam emitter 134 and second beam emitter 135, first beam emitter 134 and fourth beam emitter 137, second beam emitter 135 and third beam emitter 136, second beam emitter 135 and fourth beam emitter 137, and third beam emitter 136 and the fourth beam emitter 137 are omitted. An X and Y axis are defined on the build platform 132 and equivalently in the interlaced regions. Each beam emitter 134, 135, 136, 137 may be may be attached to track system 171 providing respective freedom of movement M1, M2, M3, M4 on at least one axis. The operating zones 220, 225, 227, and 228 may be limited by hardware or software, or may encompass the entire build platform in various additive manufacturing systems. While track system(s) 171 are omitted from the examples illustrated in FIGS. 3-4, each system 171 and its components can be located, e.g., e.g., above build platform 132 and/or other positions in respective AM systems 100. It should be apparent that any number of beam emitters and interlaced regions may be included in various additive manufacturing systems, and that the interlaced regions may overlap in various ways. It is also apparent that all interlaced regions, e.g., 230, 232, 233 are equivalent for the purposes of this disclosure. Thus, references to interlaced region 230 elsewhere in the disclosure can similar refer to interlaced regions 232, 233, etc.

Figure 5:
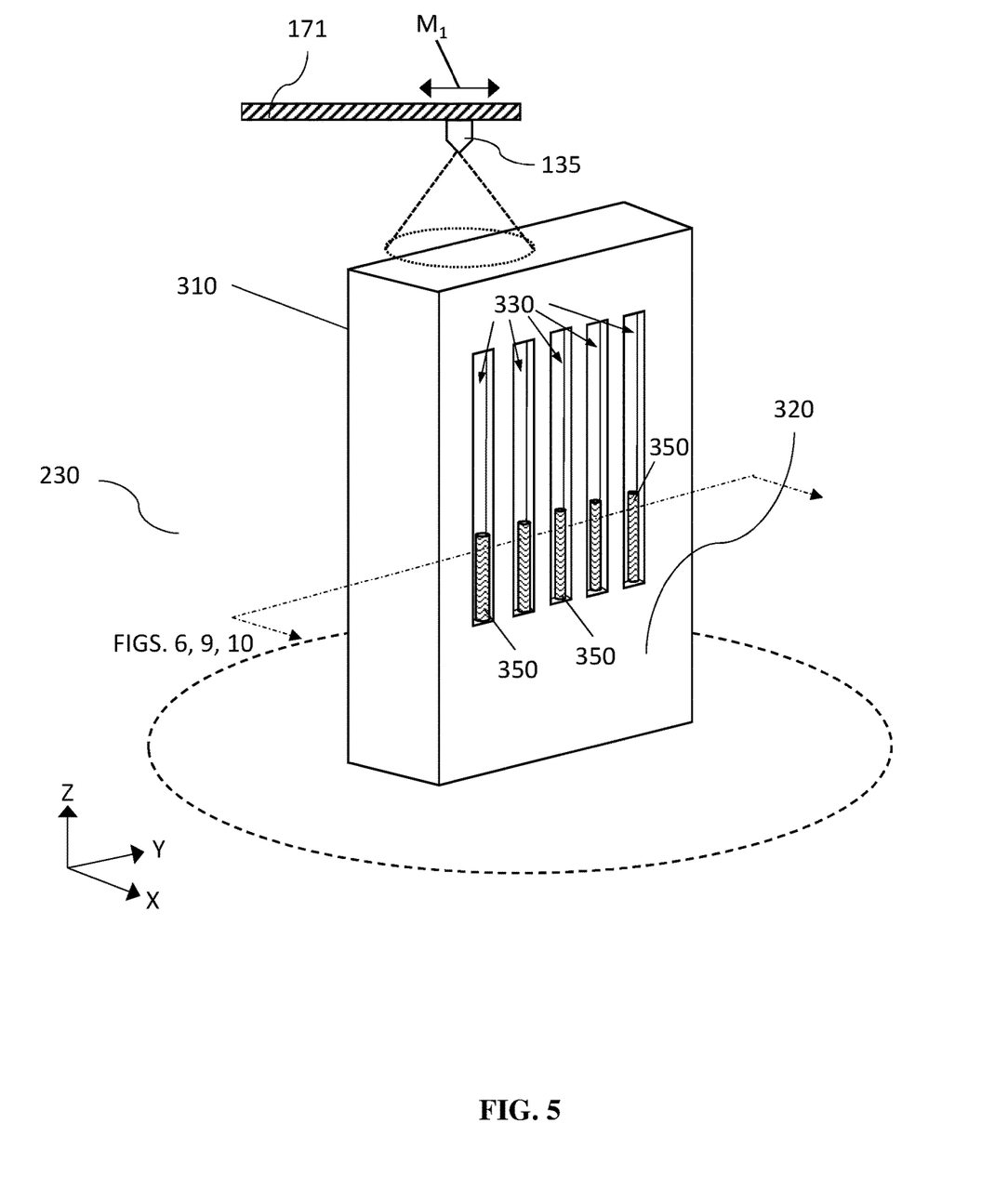
FIG. 5 shows a perspective view of the body portion of a test structure according to the disclosure.

FIG. 5 shows a perspective view of the body portion of a test structure 300 according to the disclosure. Test structure 300 can represent an object 102 formed by AM system 100 and discussed elsewhere in the disclosure, e.g., relative to FIG. 1. Test structure 300 can include a body 310 having a reference surface 320. Reference surface 320 is shown in FIG. 5 to have a substantially planar shape, but it is understood that reference surface 320 can be partially or completely non-planar in alternative embodiments. To this extent, reference surface 320 can include one or more curvilinear, angled, and/or other alternatively shaped portions sufficient for providing a spatial reference for measurement on body 310. Test structure 300 may also include multiple recesses 330 positioned on reference surface 320. Body 310 is formed by successive addition of layers along the Z axis, e.g., using the first beam emitter 134 in an interlaced region 230. It is understood that the entirety of body 310 can be formed via a single emitter as discussed elsewhere herein, e.g., to calibrate the alignment of other emitters in the same system. Body 310 may be oriented along either the X axis or Y axis of interlaced region 230. Although body 310 is shown in the shape of a substantially rectangular prism, body 310 may additionally or alternatively include any shape that defines a reference surface, and that the body may be formed either as a single unit or from multiple separate subunits. As examples, body 310 can be formed in a substantially cylindrical, pyramidal, and/or polygonal shape including at least reference surface 320 thereon. Likewise, recesses 330 may be formed in any shape, e.g. slots, rectangles, cylinders, and/or aperture, and may include distinct layers having respective geometries.

Figure 6:
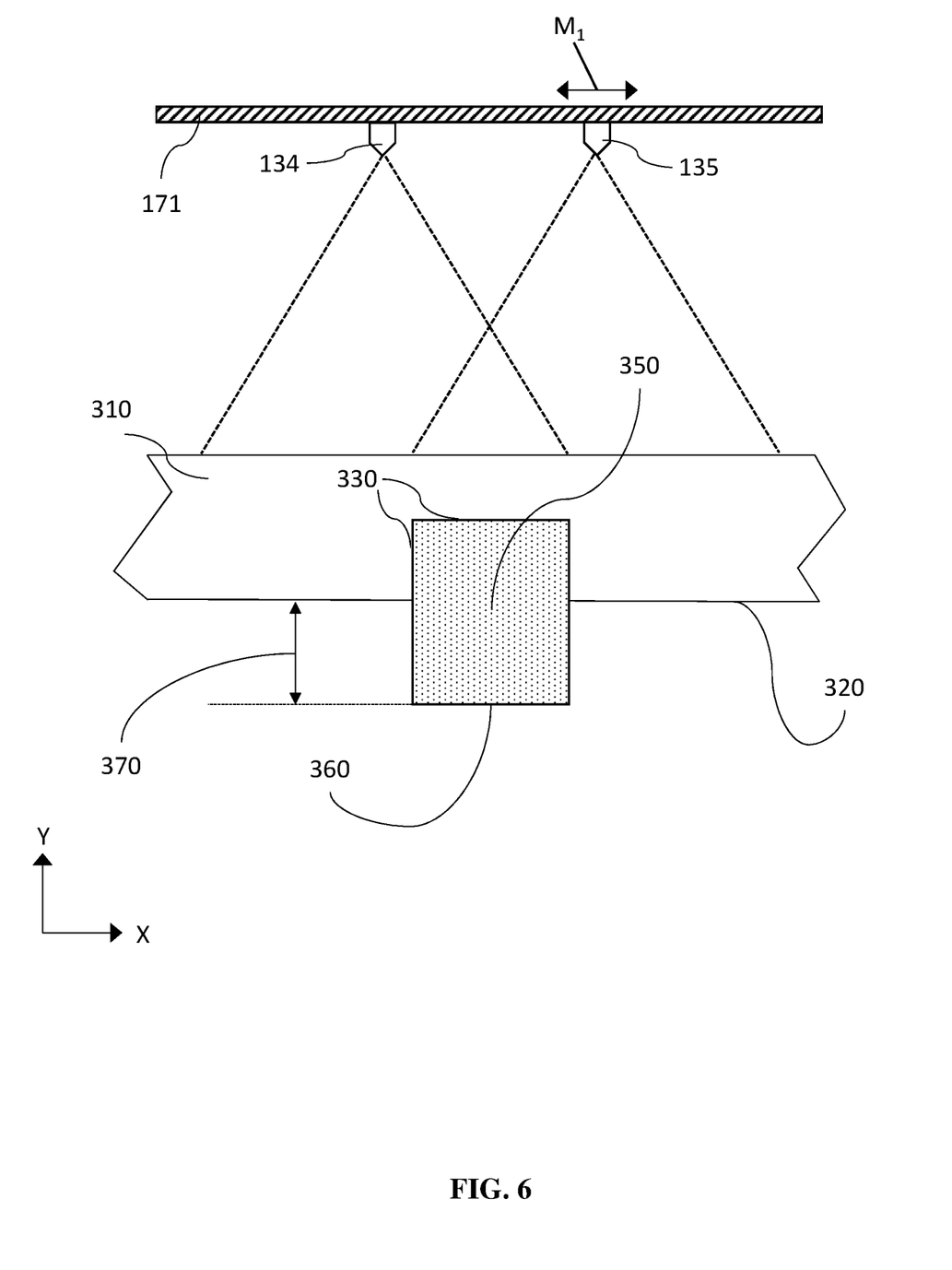
FIG. 6 shows a cross-sectional side view of a calibration feature in a test structure according to the disclosure.

Turning to FIG. 6, test structure 300 can include one or more calibration features 350 for visually inspecting test structure 300 to determine whether emitters in AM system 100 (FIG. 1) are properly aligned. Calibration features 350 of test structure 300 may be positioned within recesses 330 formed within body 310 or with considerable overlap in X or Y direction. Body 310 can be formed solely by first beam emitter 134. Calibration feature 350, by contrast, can be formed solely by second beam emitter 135 and can include an alignment surface 360 separated from reference surface 320 of body 310 by an offset distance 370. The structure and orientation of offset distance 370 can be dependent upon one or more properties of test structure 300. In addition, offset distance 370 can be calculated as a positive or negative value based on its orientation relative to planar reference surface 320. For instance, the value of offset distance 370 may be "positive" (i.e., extending out from the reference surface), "negative" (i.e., extending inward from the reference surface), or "zero" (i.e., substantially aligned and/or coincident with reference surface 320). However embodied, each calibration feature 350 may be positioned such that calibration surface 360 is located at a pre-determined offset distance 370 relative to reference surface 320, e.g., when the first and second beam emitters are properly aligned. The size of each offset distance 370 can be specific to each calibration feature 350, and may change by predetermined amounts to provide a frame of reference for visual inspection. Thus, embodiments of test structure 300 can include multiple calibration features 350 with alignment surfaces 360 separated from planar reference surface 320 by a distinct offset distance 370. According to an example, offset distances 370 of adjacent calibration features 350 may differ by a predetermined amount, e.g., approximately 5 micrometers (μm), approximately 100 μm, approximately 500 μm, etc.

Figure 7:
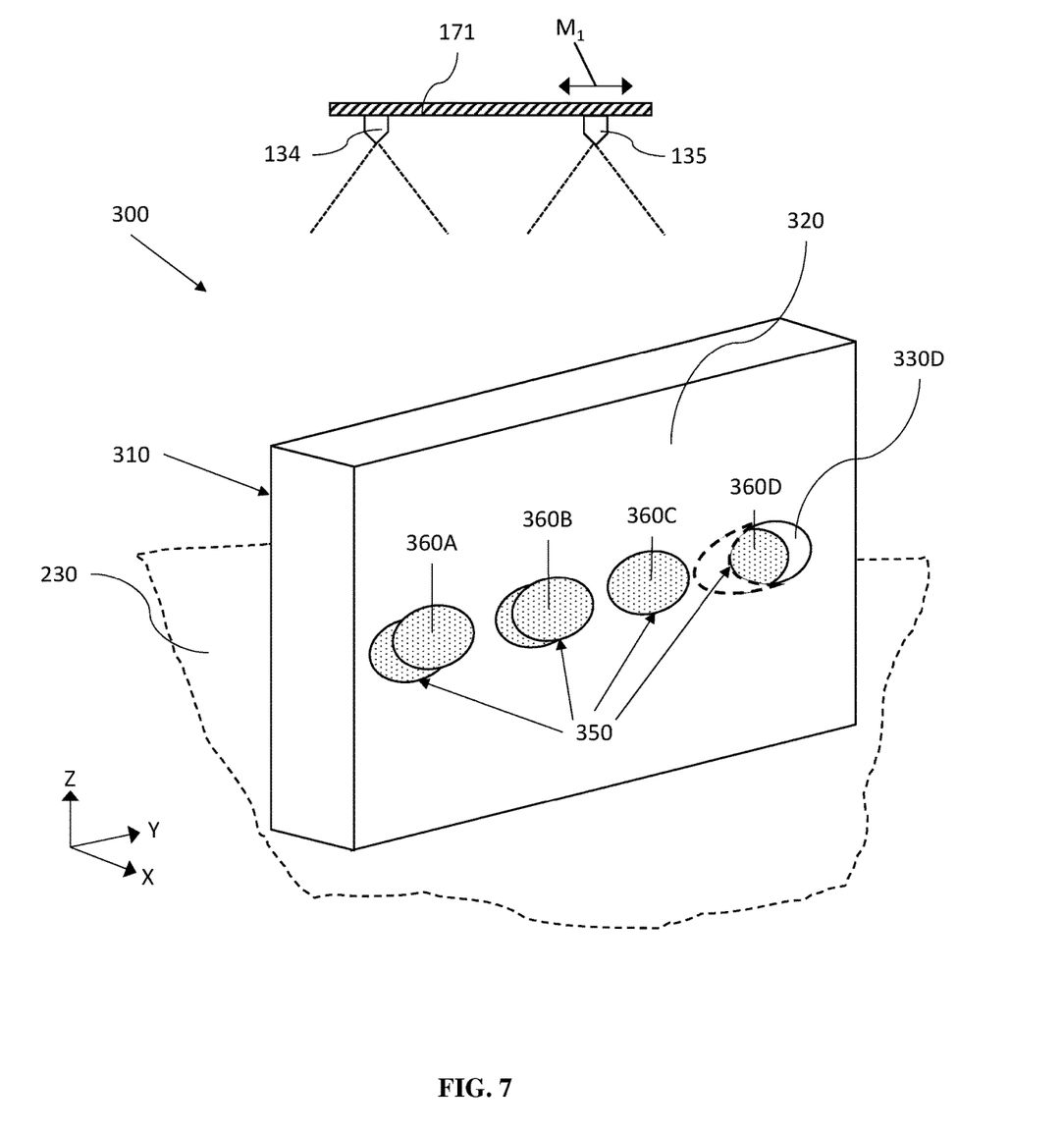
FIG. 7 shows a perspective view of a test structure and calibration features according to further embodiments of the disclosure

FIG. 7 shows a perspective view of a further embodiment of a test structure 300 with body 310 and calibration features 350 according to further embodiments of the disclosure. As compared to the substantially rectangular calibration features 350 (FIG. 6) described elsewhere herein, each calibration feature 350 may be substantially cylindrical while still including a respective calibration surface 360A, 360B, 360C, and 360D. Body 310 can thus be formed with first beam emitter 134 and each of the calibration features can be formed with second beam emitter 135 in an interlaced region 230 (FIGS. 2-4) as described elsewhere herein. The shape of recesses 330 and calibration features 350 may include any shape, e.g., slots, rectangles, cylinders, and/or various composite geometries. Likewise, recesses and 330 and calibration features 350 may be arranged on the reference surface 320 in any arrangement, e.g., a linear arrangement, a grid arrangement, a circular arrangement, an irregular or random dispersion, etc.

Figure 8:
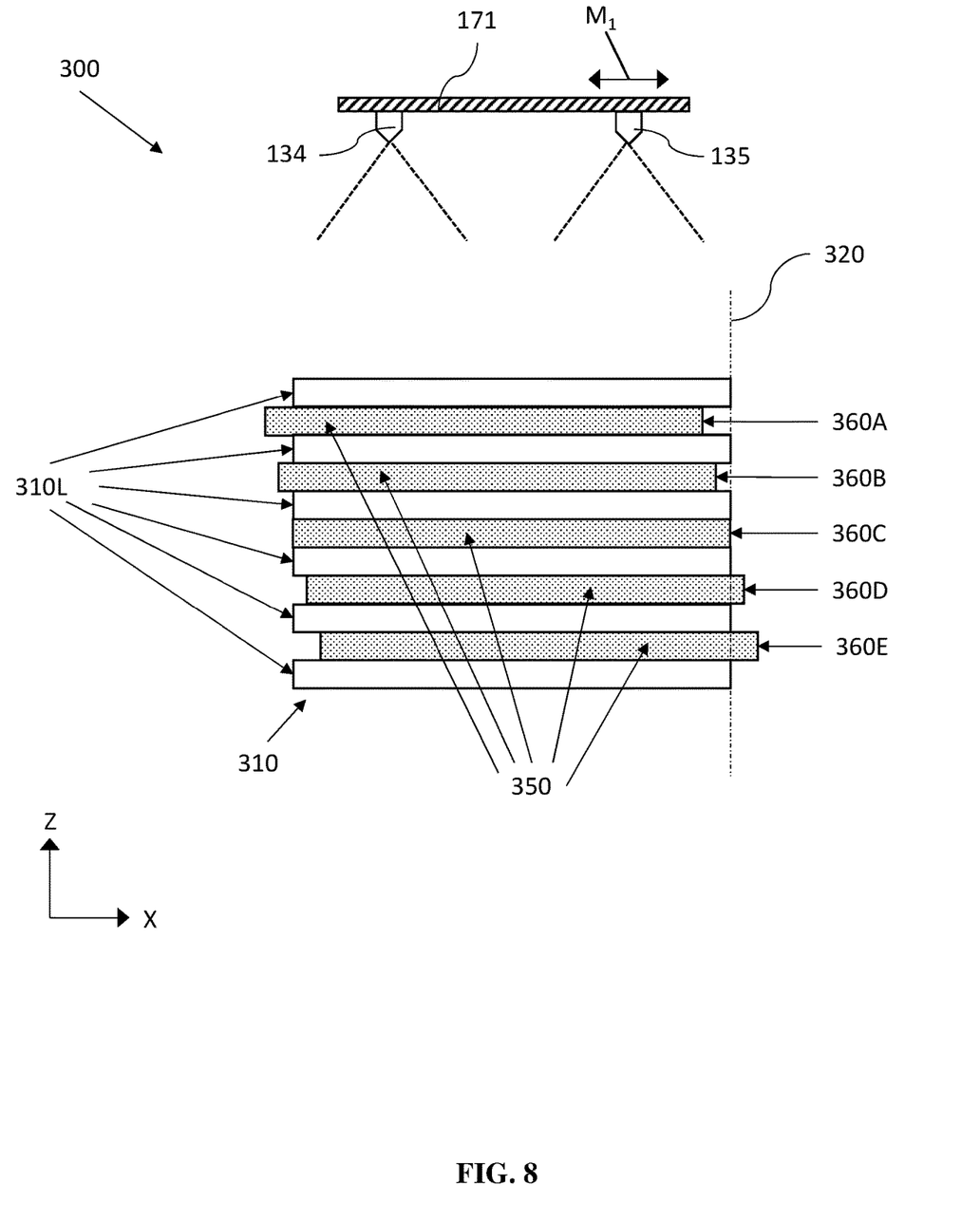
FIG. 8 shows a side view of a test structure and calibration features according to further embodiments of the disclosure.

FIG. 8 shows a side view of a test structure and calibration features according to further embodiments of the disclosure. Similar to other examples, test structure 300 can include body 310 and a plurality of calibration features 350. Each calibration feature 350 can include a respective calibration surface 360A, 360B, 360C, 360D, 360E, etc. Body 310 can be formed with first beam emitter 134 and each of the calibration features is formed with second beam emitter 135 and test structure 300 is formed in an interlaced region 230 (FIGS. 2-4). In contrast with the body 310 described elsewhere herein, body 310 may not be formed as a single unit, but rather can be formed using separate substantially overlapping layers 310L connected with alternating calibration features 350 positioned between the layers 310L. Body 310 may be formed in segments using first beam emitter 134 to form one layer 310L of body 310, followed by using second beam emitter 135 to form a calibration feature 350, then forming another layer of body 310 with first beam emitter 134, alternating beam emitters in this fashion until the complete test structure 300 has been fabricated. As in other embodiments disclosed, each layer of body 310 and/or calibration features 350 may be of any shape that provides a reference surface 320 and calibration surfaces 360. As noted elsewhere herein, reference surface 320 need not exhibit a substantially planar shape. Relative to embodiments of test structure 300 composed of layers 310, each reference surface 320 can be oriented at a respective angle relative to Z axis, and/or may exhibit complex or wave-like geometries. Regardless of how reference surface 320 is shaped, one or more layers 310L can be alternated with calibration surfaces 360A-E with a corresponding gradient offset from reference surface 320. The offset distance of each calibration features 360 can gradually increase or decrease, e.g., in a positive or negative direction, or be stepwise alternating depending on particular machine/application. Such embodiments and/or forms of test structure 300, reference surface 320, and/or calibration features 350, 360 can be applied to the various embodiments shown in FIGS. 5-7 and 9-10, and/or discussed elsewhere herein. Thus, reference surface 320 may optionally include one or more wave-shaped surfaces, arc-shaped surfaces, and/or other surfaces with non-planar profiles.

Figure 9:
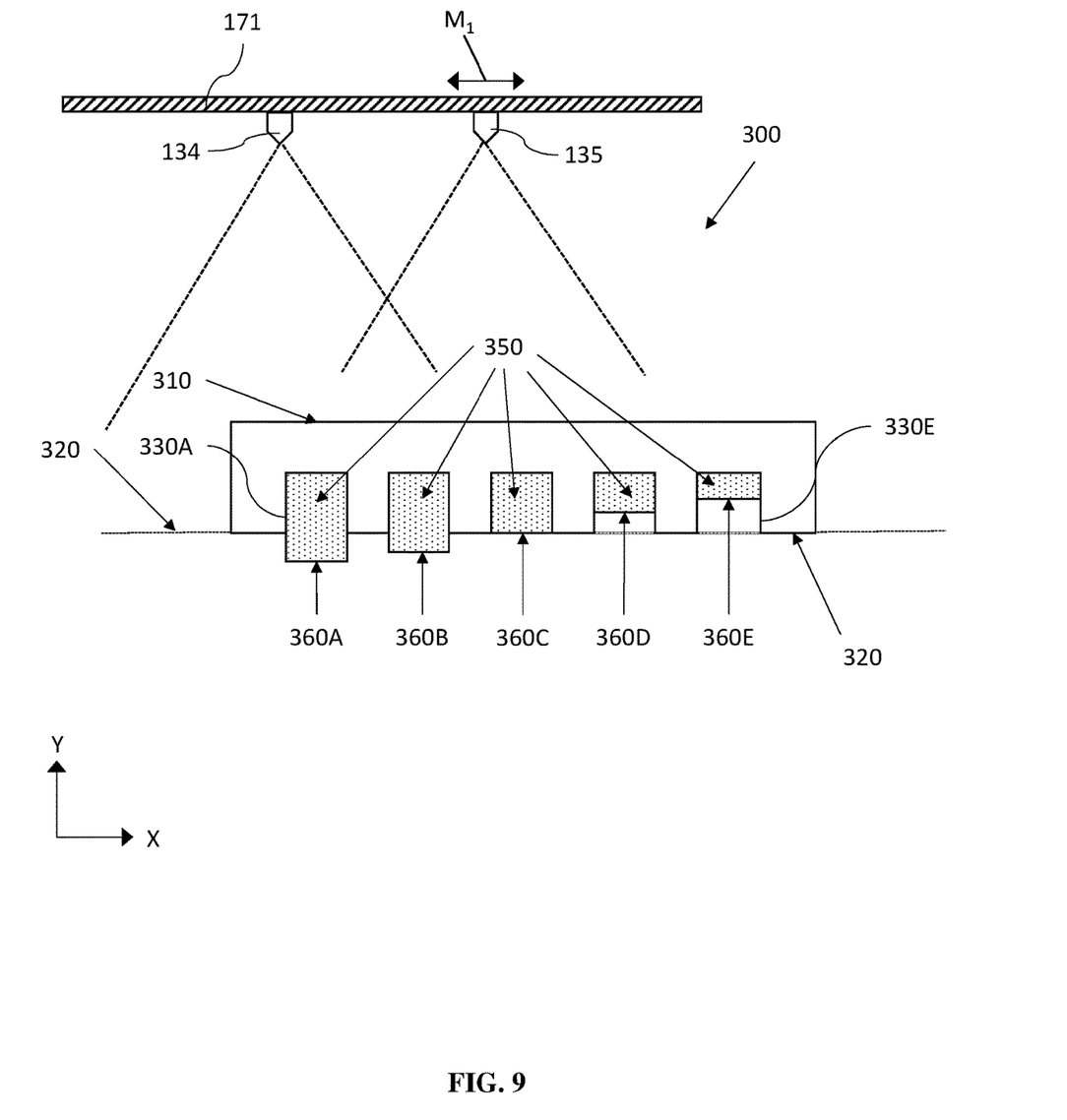
FIG. 9 shows a cross-sectional view of a test structure and calibration features according to an embodiment formed when the beam emitters are properly aligned.

To demonstrate test structures 300 with multiple calibration features 350, FIG. 9 shows a cross-sectional view of test structure 300 with body 310 and calibration features 350 according to the disclosure, e.g., formed in an embodiment of AM system 100 with properly aligned beam emitters. Each calibration feature 350 can include a respective calibration surface 360A, 360B, 360C, 360D, and 360E and respective offset distance (e.g., offset distance 370 (FIG. 6)). As described herein, body 310 can be formed with first beam emitter 134 and each of the calibration features can be formed with second beam emitter 135 and test structure 300 is formed in an interlaced region 230 (FIGS. 2-4). As described elsewhere herein, regardless of how test structure 300 is shaped, a user can visually inspect calibration features 350 to determine whether emitters (e.g., first and second emitters 134, 135 of AM system 100) are properly aligned. More specifically, a user can identify the amount of offset distance 370 between calibration surfaces 360 of calibration features 350 and planar reference surface 320 of body 310. Various methodologies for evaluating alignment between emitters according to the disclosure are therefore discussed.

One aspect of the method of the disclosure includes fabricating a test structure 300 according to the disclosure. Test structure 300 can be fabricated, e.g., by applying AM system 100 (FIG. 1) with code 108 (FIG. 1) for producing body 310 and calibration features 350 of test structure 300 according to structure embodiments described elsewhere herein. A user can then visually inspect test structure 300 to determine whether emitters 134, 135 of AM system 100 are properly aligned, and/or can determine a misalignment distance based on a difference between the alignment surfaces 360 as fabricated and the expected position of the alignment surfaces 360. To determine whether emitters 134, 135 are misaligned, a user can compare the offset distance 370 of each calibration surface 360 of calibration surface 350 relative to planar reference surface 320 of body 310.

The amount of offset distance 370 can then be compared a predetermined offset value or range of values, allowing a user to evaluate whether the emitters of system 100 are aligned within a predetermined margin of error. Alignment between emitters in system 100 may be visually verified by observing that calibration surface 360C is aligned with a corresponding reference surface 320. The calibration surface which indicates proper alignment is pre-determined by code 108 (FIG. 1). Observing a calibration surface 360 other than the pre-determined surface aligned with reference surface 320 indicates misalignment. The specific calibration feature 360 observed to be aligned with reference surface 320 indicates the misalignment distance within a predetermined margin of error. The user can then adjust first and/or second beam emitters 134, 135, e.g., with track system 171 and/or control system 104 (FIG. 1), to correct any misalignment within the predetermined margin of error.

Figure 10:
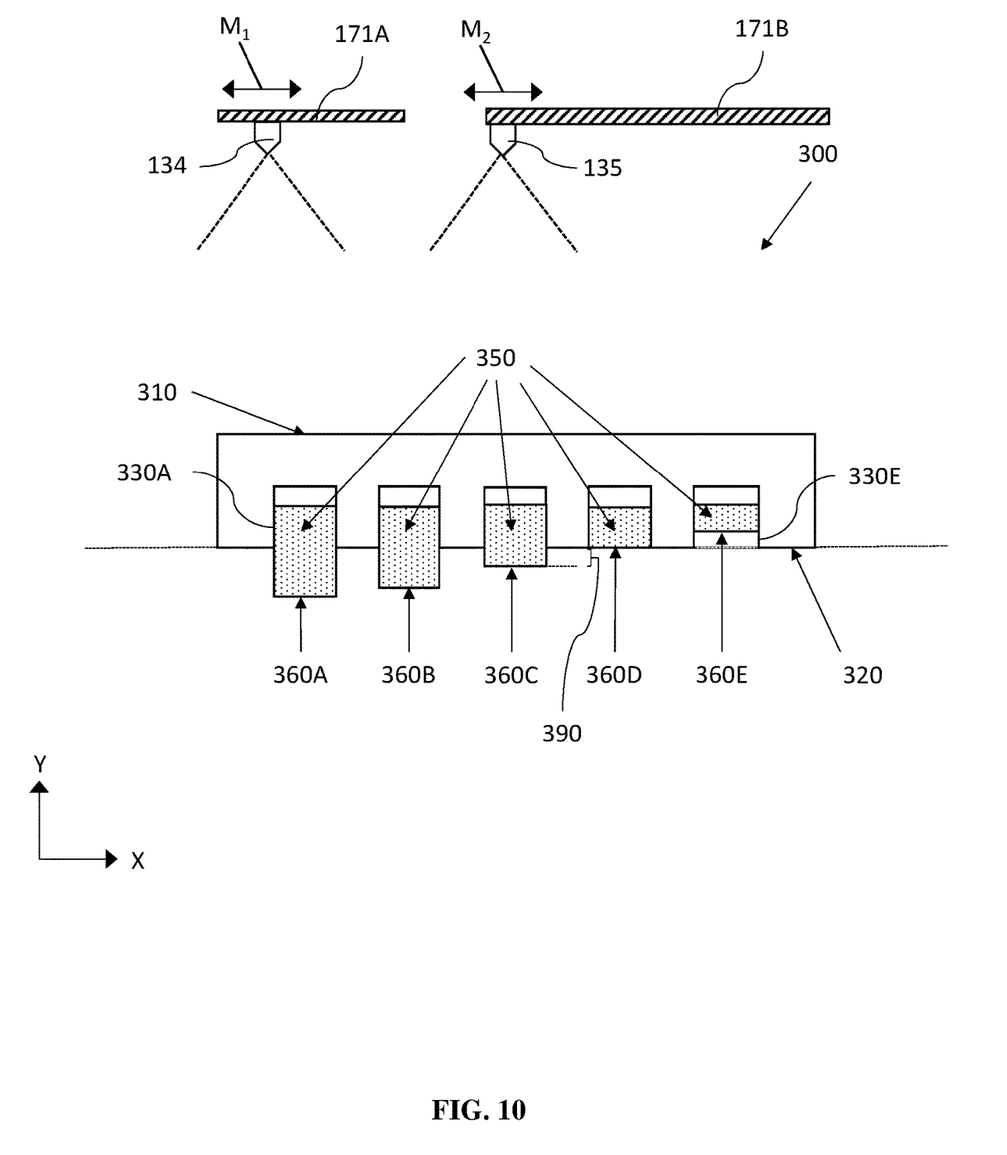
FIG. 10 shows an example of test structure and calibration features indicating misaligned emitters according to embodiments of the disclosure.

FIG. 10 shows an example of test structure and calibration features indicating misaligned emitters according to embodiments of the disclosure. One aspect of the method of the disclosure includes fabricating a test structure 300 with AM system 100 according to the disclosure. A user can then visually inspect test structure 300 to determine a misalignment distance 390 to identify any differences between the alignment surfaces 360 as fabricated and the expected position of the alignment surfaces 360. An alignment correction between first beam emitter 134 and second beam emitter 135 may be calculated by comparing the offset of calibration surfaces 360 to a predetermined value and evaluating whether the emitters are aligned within a predetermined margin of error. Adjustments may be made to first and/or second beam emitters 134, 135 employing track system 171 and/or control system 104 (FIG. 1) to correct any misalignment within the predetermined margin of error.

AM system 100, control system 104, and/or operators thereof can account for and/or correct misalignment between emitters (e.g., first and second beam emitters 134, 135) in a variety of ways. For example, an operator of AM system 100 may initially extract the built test structure 300 from build platform 132. Without additional equipment, the operator and/or a visual inspection tool of AM system 100 (e.g., one or more cameras) can visually identify which calibration surfaces 360 (if any) align with their corresponding reference surface 320, which calibration surfaces 360, e.g., surfaces 360A-C protrude above reference surface 320 (if any), and which calibration surfaces 360, e.g., surface 360E, are recessed relative to surface 320 (if any).

The position of each calibration surface 360 relative to reference surface 320 can indicate whether any scanners of AM system 100 are properly aligned, and/or the degree of any misalignment. In an example of a method according to the disclosure, an operator may conclude that calibration surface 360D of test structure 300 (e.g., shown in FIG. 9) is substantially aligned with reference surface 320, instead of mark 360C pursuant to the original design structure. This discrepancy between the actual and expected form of test structure 300 indicates that the relative positions of body 310 calibration features 350 were distorted by misalignment between beam scanners of AM system 100 (e.g., beam emitters 134 and 135). Such distortion can produce a shift 390 (FIG. 10 only) between body 310 and one or more calibration features 350. According to an example, the design configuration of test structure 300 can define the correct offset distance between calibration surfaces 360A-E as being, for example, approximately 50 μm. In this case, shift 390 on the manufactured test structure 300 can indicate that first and second beam emitters 134, 135 are misaligned by a distance of approximately 50 μm. In other words, test structure 300 indicates that beam emitter 134 would be locally (near the alignment sample) misaligned with beam emitter 135 by the value of 50 μm in Y axis as shown in FIG. 10.

Figure 11:
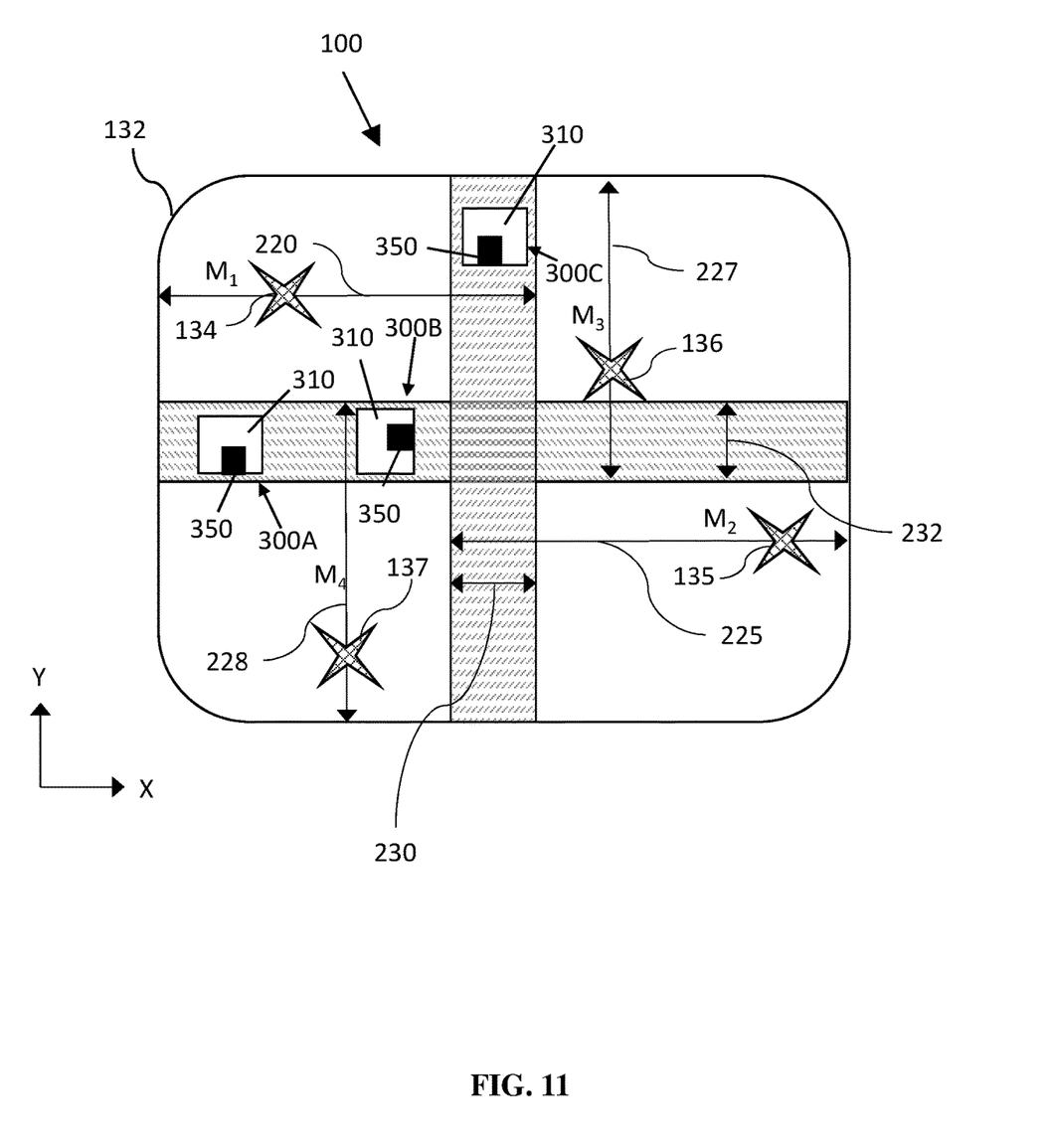
FIG. 11 shows a plan view of an additive manufacturing system build platform with multiple interlaced regions and multiple test structures in different interlaced regions and aligned with different axes.

In any event, visually inspecting which calibration features 350 are aligned with reference surface 320 as compared to the design of test structure 300 can indicate a degree of misalignment between beam scanners of AM system 100, e.g., first and second beam emitters 134, 135. Although the examples described herein illustrate misalignment on one axis (e.g., Y axis in FIG. 10), additional samples can be built on build platform 132 to measure misalignment in X and Y axes in respective interlaced regions. Turning briefly to FIG. 11, multiple test structures 300 are shown in respective interlaced regions 230, 232. The multiple test structures 300 in interlaced regions 230, 232 can indicate alignment or misalignment between respective scanners of AM system 100 in more complex situations. For example, if an operator only wishes to analyze a relative shift in X and Y axes, then it may be sufficient to build two test structures 300 in a single interlaced region, e.g., interlaced region 230 or 232. To analyze beam emitters 134, 135 which may have respective shifts along X or Y axis along with other sources of misalignment, e.g., relative tilt and scale, various positions within each interlaced region 230, 232 can include multiple test structures 300 having respective orientations to provide a predetermined number of samples for alignment. According to one example, AM system 100 can produce test structures 300 with varying positions and orientations to account for shifts along different axes. In such cases, an operator can collect the various test structures 300 from respective positions on build platform 132, and then analyze calibration features 350 and bodies 310 of each test structure 300 to analyze local misalignment along a respective axis. Taken together, the attributes of each test structure 300 on one build platform 132 can be used to identify or calculate an amount of shifting, tiling, or scaling of each set of beam scanners, e.g., beam scanner 134 relative to beam emitter 135 or vice versa. The resulting values can, optionally, be input to control system 104 to compensate for any misalignment and thus correctly produce future components built with AM system 100. In an example, each test structure 300 may have a relatively small surface area (e.g., approximately one tenth, one hundredth, etc.) as compared to build platform 132. The small size of test structure(s) 300 as compared to build platform 132 can allow a user to manufacture multiple test structures 300 in a single AM system 100 alongside other parts, and without significantly affecting the amount of resources used by a production supply chain.

Returning to FIG. 10, an embodiment of test structure 300 formed with misaligned laser emitters is shown to demonstrate embodiments where correction of AM system 100 may be desirable. According to the example shown along Y axis in FIG. 10, the expected position of calibration surface 360C is aligned with (i.e., substantially coplanar, flush, coincident, etc.) reference surface 320 within the predetermined margin of error. The expected position of calibration surface 360D is a negative offset distance from substantially planar surface 320. Visual observation of the fabricated test article 300 can show that calibration surface 360C has a positive offset distance from the reference surface 320 and that calibration surface 360D has a zero offset distance from reference surface 320. Thus, the appearance of calibration of features 350 on body 310 visually indicates that the emitters used to form test structure 300 are improperly aligned. The predetermined difference between offset distances 370 enables determination of the misalignment distance 390 without the use of equipment such as, e.g., a microscope or coordinate measuring machine. A user can then calculate an amount of alignment correction along the Y axis based on, e.g., the amount of misalignment distance 390, and adjustments made to first beam emitter 134 or second beam emitter 135 by manually adjusting track system 171 Alternatively, the beam emitter(s) may be adjusted by control system 104 (FIG. 1) based either on user input or based on instructions contained in computer code 108 and executed by computer 110. Instead of and/or in addition to adjusting track system 171, control system 104 may modify code 108O defining object 102.

It is apparent that the same method may be performed using different embodiments of the test structure 300, different combinations of beam emitters 134, 135, 136, and 137 and along different axes X or Y.

FIG. 11 shows a plan view of an additive manufacturing system build platform with multiple interlaced regions 230, 232 and multiple test structures 300A, 300B, and 300C formed in different interlaced regions 230, 232 and aligned with different axes. Fabricating multiple test structures 300 in one build cycle may create improved operating efficiency. Alignment corrections can be determined between multiple pairs of beam emitters 134, 135, 136, 137 in multiple interlaced regions 230, 232, and along multiple axes X, Y in one build cycle. Referring to FIG. 9 and FIG. 10, visual inspection of each test structures 300A, 300B, 300C can be used to determine if the specific beam emitters used to fabricate the test structure are properly aligned along an axis. If inspection reveals misalignment, alignment corrections(s) may be determined and adjustment(s) performed in accordance with the method of the disclosure.

It is understood that in the process embodiments described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method for aligning beam scanners in an additive manufacturing (AM) system, comprising:

fabricating a test structure with at least two beam scanners of the AM system, the test structure including:

a body on a build platform of the AM system, the body having a reference surface, wherein the body is formed with a first beam scanner of the AM system, wherein the body comprises a plurality of substantially aligned layers which define the reference surface; and a plurality of calibration features defined on the reference surface of the body, wherein each of the plurality of calibration features includes an alignment surface positioned at an offset distance relative to the reference surface, each of the plurality of calibration features includes a calibration layer positioned between two of the substantially aligned layers of the body, and wherein each of the plurality of calibration features is formed with a second beam scanner of the AM system different than the first beam scanner;

calculating an alignment correction for the first and second beam scanners of the AM system based on a difference between a position of the fabricated plurality of alignment surfaces and an expected position of the plurality of alignment surfaces; and adjusting at least one of the first and second beam scanners based on the calculated alignment correction calculation.

2. The method of claim 1, wherein the body comprises a plurality of recesses disposed on the reference surface, and wherein each of the plurality of calibration features is positioned within one of the recesses.

3. The method of claim 1, wherein the alignment surfaces are offset inwardly or outwardly relative to the reference surface of the body.

4. The method of claim 1, wherein the fabricating includes fabricating a plurality of test structures on the build platform, at least one test structure oriented with respect to an x-axis and at least one test structure oriented with respect to a y-axis on the build platform; wherein the calculating further includes calculating an alignment correction for each of the x-axis and the y-axis on the build platform based on a misalignment distance for each of the plurality of test structures.

5. The method of claim 1, wherein the AM system comprises more than two beam scanners having a plurality of interlaced regions, wherein a first operating zone of the first beam scanner and a second operating zone of the second beam scanner overlap within each of the plurality of interlaced regions; and wherein the fabricating includes fabricating the plurality of test structures in a plurality of interlaced regions on the build platform; wherein the calculating further includes calculating an alignment correction for each of the more than two beam scanners based on a misalignment distance for each of the plurality of test structures.

6. The method of claim 1, wherein the AM system comprises a direct metal laser melting machine, and wherein the first and second beam scanners each include a laser emitter.

* * * * *